United States Patent
Adas et al.

(10) Patent No.: US 7,281,009 B2
(45) Date of Patent: Oct. 9, 2007

(54) VLSI ARCHITECTURE AND IMPLEMENTATION FOR SINGLE CYCLE INSERTION OF MULTIPLE RECORDS INTO A PRIORITY SORTED LIST

(75) Inventors: Marwan Ahmad Adas, Frisco, TX (US); Vijay Sundarajan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 387 days.

(21) Appl. No.: 10/983,255

(22) Filed: Nov. 4, 2004

(65) Prior Publication Data

US 2005/0132242 A1 Jun. 16, 2005

Related U.S. Application Data

(60) Provisional application No. 60/517,609, filed on Nov. 4, 2003.

(51) Int. Cl.
*G06F 7/00* (2006.01)
(52) U.S. Cl. .......................................................... 707/7
(58) Field of Classification Search .................... 707/7; 705/5
See application file for complete search history.

(56) References Cited

U.S. PATENT DOCUMENTS

| | | | | |
|---|---|---|---|---|
| 5,717,915 A | * | 2/1998 | Stolfo et al. | 707/5 |
| 5,819,082 A | * | 10/1998 | Marion | 707/7 |
| 5,926,815 A | * | 7/1999 | James, III | 707/7 |
| 6,434,560 B1 | * | 8/2002 | Case | 707/7 |

* cited by examiner

*Primary Examiner*—Pierre Vital
*Assistant Examiner*—Noosha Arjomandi
(74) *Attorney, Agent, or Firm*—Robert D. Marshall, Jr.; W. James Brady; Frederick J. Telecky, Jr.

(57) ABSTRACT

A data processing apparatus simultaneously sorts n input data words into a sorted list of m list entries. The apparatus includes a pre-sorting network sorting the n input data words and a sorting network storing up to m list entries and storing respective input data words into the m list entries. The pre-sorting network includes a set of comparators for each unique pair of input data words, and a set of n multiplexers outputting a selected one of the n input data words, and a decoder circuit controlling the multiplexers responsive to the comparisons. The sorting network includes m basic units storing current list entries ordered from greatest to least. Each cycle the basic units selecting for storage the current list entry, a current list entry of a basic units storing greater list entries or one of the input data words.

4 Claims, 3 Drawing Sheets

VLSI ARCHITECTURE AND IMPLEMENTATION FOR SINGLE CYCLE INSERTION OF MULTIPLE RECORDS INTO A PRIORITY SORTED LIST

CLAIM OF PRIORITY UNDER 35 §119(e)(1)

This application claims priority under 35 U.S.C. §119(e)(1) from U.S. Provisional Application No. 60/517,609 filed Nov. 4, 2003.

TECHNICAL FIELD OF THE INVENTION

The technical field of this invention is computer list sorting.

BACKGROUND OF THE INVENTION

Based on the current technology, inserting a single record into a priority sorted list in a single clock cycle at 123 MHz is possible. This structure was very valuable in the current generation TCI110 catalog product from TI Wireless Infrastructure. For the next generation product, there arose a need for a structure that can accept two records simultaneously into the sorted list.

There is much prior art literature and patents involving sorting but none addressed the problem of simultaneous insertion of multiple records. Multiple methods and hardware implementations of sorting networks that process and sort records in series have been extensively studied and analyzed in the prior art. In addition, there are descriptions of parallel sorting of multiple records by using multiple pipelined processors over multiple cycles. The current art does not describe single cycle sorting and insertion hardware.

SUMMARY OF THE INVENTION

The present invention achieves ordered list sorting insertion of plural new entries in a single clock cycle. This invention is a technique enabling single clock cycle insertion of multiple records into a priority sorted list so long as the technology allows for a single record insertion into such a list in a single clock cycle.

This invention uses the observation that merging two sorted lists is always possible with a number of comparisons equal to the size of the final list regardless of the sizes of the two original lists. This observation enables 2 or more new records to be inserted simultaneously into the sorted list.

BRIEF DESCRIPTION OF THE DRAWINGS

These and other aspects of this invention are illustrated in the drawings, in which.

DETAILED DESCRIPTION OF PREFERRED EMBODIMENTS

The motivation for the invention is that the data processing rate of the hardware sorting network used in the current generation of the Texas Instruments Wireless Infrastructure device TCI110 is not sufficient to handle the specified input data rate of the next generation infrastructure device. The current network operates at 123 MHz and can only process one record from one source per cycle. The next generation device needs to process two records from two sources per cycle at the same clock frequency. An obvious solution is to add a pipeline and double the clock frequency of the current sorting network. This is not feasible due to the current ASIC technology limitations. This solution is also less attractive because another clock domain would needed. Such and additional domain can lead to additional clock network complexity and lead to undesirable cross clock domains communications.

This invention utilizes a novel architecture for sorting and inserting multiple records from multiple sources in a single cycle. This invention is more efficient than the obvious clock doubling technique. Additionally, this invention is applicable other technologies such as image processing real time median filtering, database processing, DMA priority queuing and physical measurement filtering. This invention can reduce the number of separate fixed priority queues in direct memory access (DMA) applications by combining those queues into a single sorted queue. This allows insertion of multiple entries in a single cycle.

Figure 1:
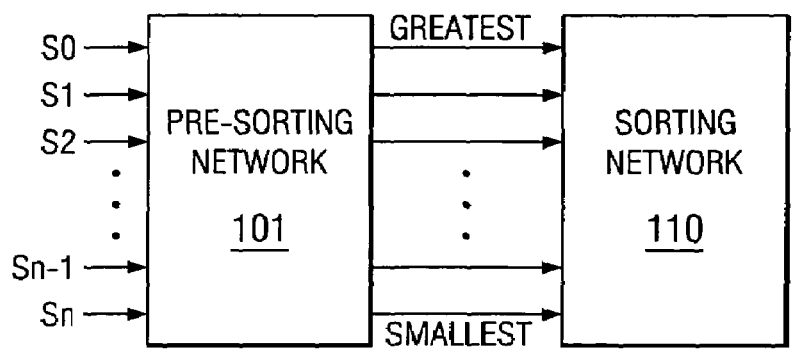
FIG. 1 illustrates the high level architecture of this invention.

FIG. 1 illustrates the architecture for the single cycle sorting and insertion of n multiple, simultaneous input records and their associated keys from multiple data streams. Each of the input words from a single data stream includes a fixed number of bits B. The multiple, simultaneous data entries are supplied to pre-sorting network 101. Pre-sorting network 101 sorts the input words S0, S1, S2 . . . Sn−1 to Sn into a set of n outputs in order from the greatest to the least. This intermediate set of signals is supplied to sorting network 110. Sorting network 110 places the received intermediate signals and inserts them into the prior list.

This architecture allows the sorting of N records in N/n cycles. This sorting architecture scales at a rate of O(N/n) in time complexity and linearly in area complexity. The sorting task is divided into two functional entities: pre-sorting network 101 and sorting network 110. Multiple continuous parallel input words from n different streams S0, S1, S2 . . . Sn−1 to Sn enter pre-sorting network 101 every clock cycle. Pre-sorting network 101 rearranges the incoming n words in descending order and presents the ordered list of the new words to sorting network 110. Sorting network 110 calculates the appropriate insertion point for each of the newly arrived words. Sorting network 110 then inserts the new words at those calculated insertion points in parallel. Sorting network 110 maintains a sorted list of m entries, where m is the total number of elements in the final sorted list.

This architecture can be used as a hardware sorter, where the total number of words to be sorted per stream is equal to m/n, or as a selection filter that collects the maximum m words of very large sequences. This architecture is expandable. Sorting network 110 is very modular. The number of list entries m can be made as large as desired with negligible impact on timing and a linear impact on area.

Figure 2:
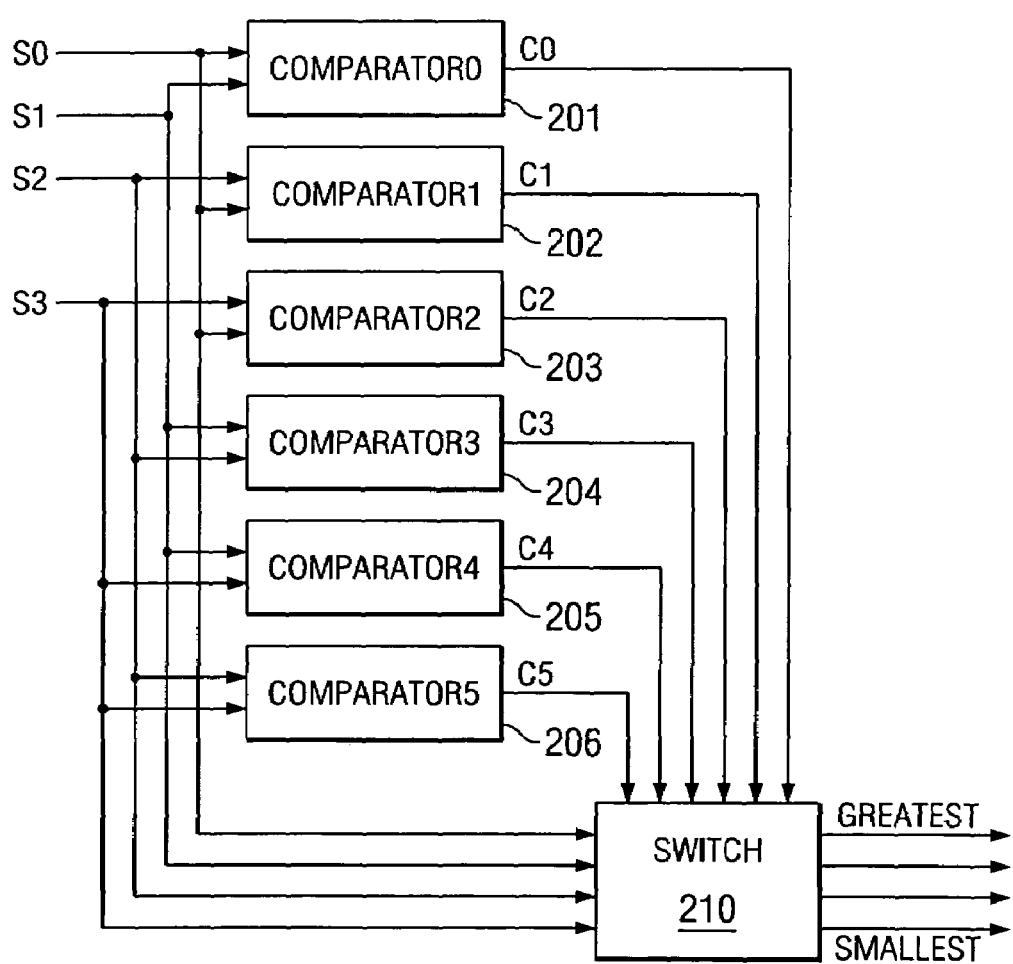
FIG. 2 illustrates the pre-sorting network illustrated in FIG. 1.

FIG. 2 illustrates the construction of an example pre-sorting network that 101 sorts 4 inputs s0, s1, s2 and s3. Pre-sorting network 101 includes comparators 201, 202, 203, 204, 205 and 206. Each comparator 201, 202, 203, 204, 205 and 206 compares a pair of the B-bit input words S0, S1, S2 and S3. The respective outputs C0, C1, C2, C3, C4 and C5 indicate the greatest data input of the corresponding comparator. Switch 210 receives the input signals S0, S1, S2 and S4 and the comparison outputs C0, C1, C2, C3, C4 and C5. Switch network is a set of multiplexers controlled by the comparison output. Switch 210 outputs four signals. These four signals are the inputs S0, S1, S2 and S3 sorted from greatest to least. In general pre-sorting network 101 requires $n(n-1)/2$ comparators for n input signals. This number of comparators is sufficient to form the comparison of every pair of the input signals.

Figure 3:
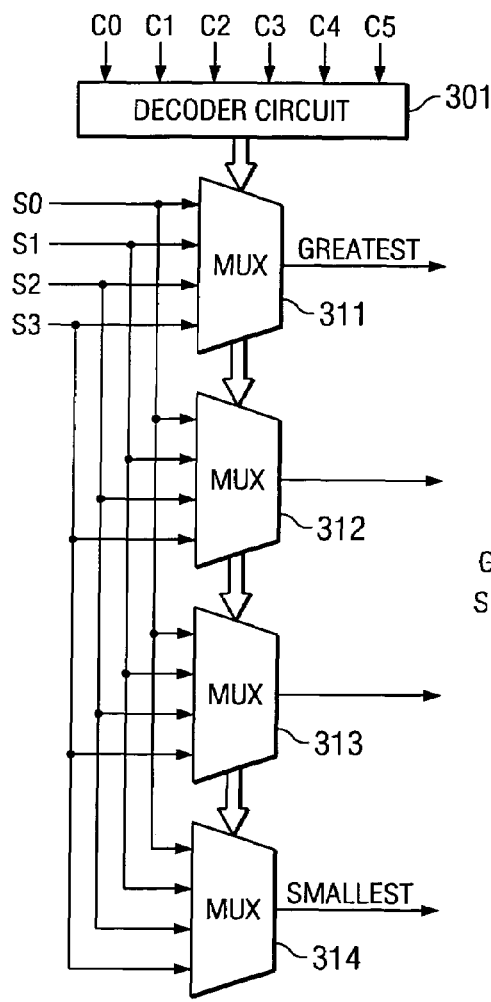
FIG. 3 illustrates the switch illustrated in FIG. 2.

FIG. 3 illustrates a switch 210 for sorting four simultaneous inputs according to the example of FIG. 2. Switch 210 is constructed of the number n multiplexers 311, 312, 313 and 314, each having n inputs and one output. In this example n=4. Each multiplexer 311, 312, 313 and 314 drives one of the outputs from a selected one of the n input words S0, S1, S2 and S3. Decode circuit 301 receives the six comparison signals C0, C1, C2, C3, C4 and C5. Decoder circuit 301 controls the multiplexers 311, 312, 313 and 314 to arrange the output from greatest to least from multiplexers 311, 312, 313 and 314. Each multiplexer 311, 312, 313 and 314 selects a unique one of the input data words S0, S1, S2 and S3 as controlled by decode network 310. Note that while there are $2^6=64$ possible states of the six comparison signals C0, C1, C2, C3, C4 and C5, there are only $4!=24$ possible sorting results. Not all possible states of C0, C1, C2, C3, C4 and C5 are permitted. For example, if S0>S1 and S2>S3, then the state S3>S1 is not permitted.

The delay time from pre-sorting network 101 is limited to the propagation delay of one B by B comparator (201, 202, 203, 204 and 205) and one multiplexer (311, 312, 313 and 314). This delay is minimal due to the high parallelism. However, the area can grow very fast with a large number of input streams. Thus this invention is best suited for low number of input streams when single cycle processing is desired. Otherwise, the same architecture can be pipelined to meet the specific timing requirements.

Figure 4:
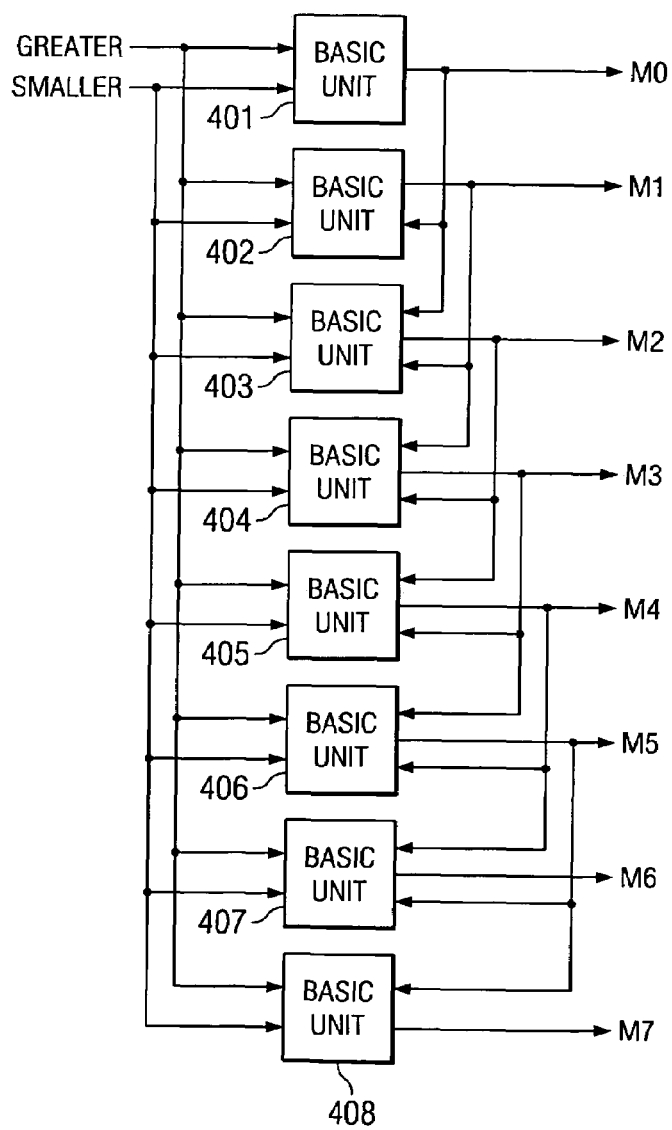
FIG. 4 illustrates the sorting network illustrated in FIG. 1.

FIG. 4 illustrates an example sorting network 110 for two inputs with a total list size of 8. This example sorting network 110 accepts 2 sorted words (greater, smaller) as input from pre-sorting network 101 every cycle. Sorting network 110 merges these presorted words with the sorted entries. Sorting network 110 locates an insertion point in the sorted list for each of the incoming sorted words. The sorting network structure is modular and made of m basic units (401, 402, 403, 404, 405, 406, 407 and 408). Basic units 401, 402, 403, 404, 405, 406, 407 and 408 are cascaded together to form the m-sorting unit network.

The basic unit is the fundamental building block of sorting network 110. An m-entry list includes m basic units stacked vertically as illustrated in FIG. 4. These basic units store the current sorted list with the top basic unit storing the greatest entry and the bottom valid basic unit storing the smallest entry.

Each basic unit includes: n comparators; one multiplexer having 2n+1 inputs and one output; one 2 by B-bits register, for the B-bit record and the B-bit key; and a control unit that controls the selection of the multiplexer. All entries in all the cascaded basic units are invalidated upon start of a new sequence of sorting cycles. Each comparator performs a B by B comparison between the current entry of the basic unit and a corresponding one of the n new input words. The control unit uses the results of the current basic unit comparators, the results of the comparators of the n basic units above the current basic unit, along with valid signals for the current entry of the current basic unit and the current entries of the n basic units above the current basic unit. The control unit uses this information to direct the multiplexer to select one of the 2n+1 records.

Figure 5:
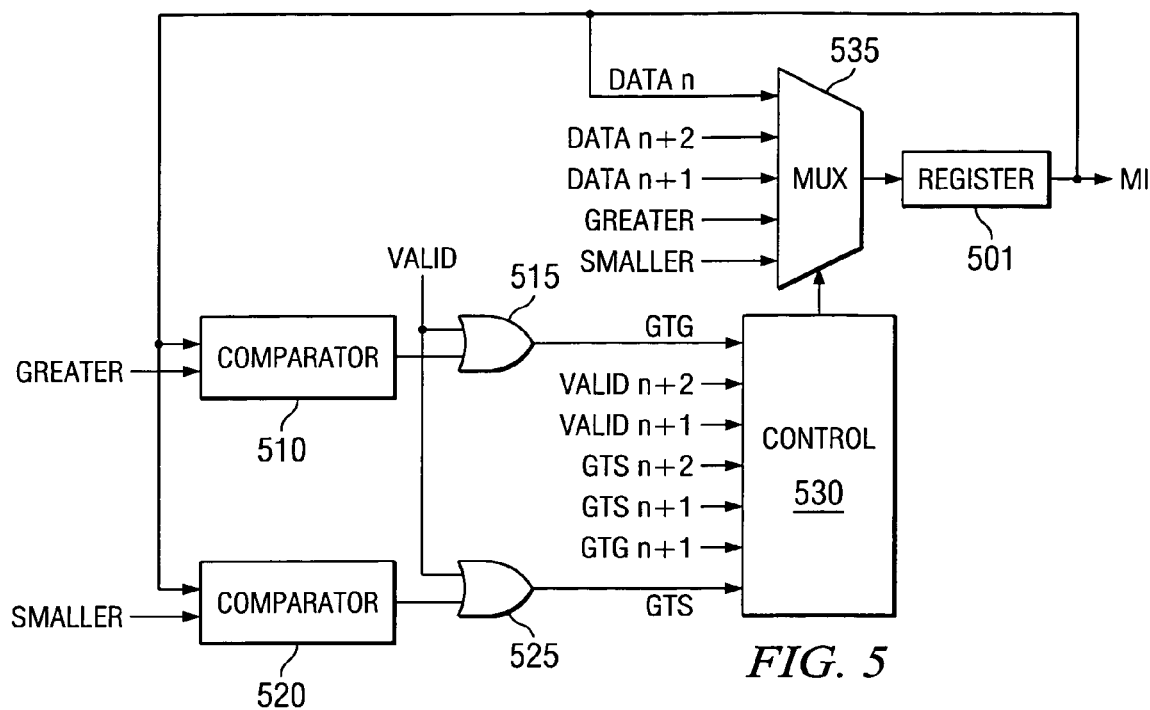
FIG. 5 illustrates the basic sorting unit of this invention.

FIG. 5 illustrates the basic unit for the example of n=2 data streams. Each basic unit includes n comparators, one comparator for each input data word. In the example of FIG. 5, comparator 510 compares the greater output of pre-sorting network 101 with the current data in register 501. Similarly, comparator 510 compares the smaller output of pre-sorting network 101 with the current data in register 501. The comparison outputs are conditioned by a valid signal for the current basic unit via respective OR gates 515 and 525. The signal gtg from OR gate 515 indicates whether the current entry stored in register 501 is greater than the greater input from pre-sorting network 101. The signal gts from OR gate 525 indicates whether the current entry stored in register 501 is greater than the smaller input from pre-sorting network 101. Control circuit 530 receives the gtg signal, the gts signal as well as valid signals from two basic units above the current basic unit (valid n+2, valid n+1), the gts signal from the second higher basic unit (gts n+2), the gts signal from the next higher basic unit (gts n+1) and the gtg signal from the next higher basic unit (gtg n+1). Control circuit 530 controls multiplexer 535 to select one of the following signals: the current data n; the data from the second higher basic unit data n+2; the data from the next higher basic unit data n+2; the greater input; and the smaller input. This selected data is stored in register 501 as the sorted list entry. The content of register 501 is the current sorted list entry mi.

Figure 6:
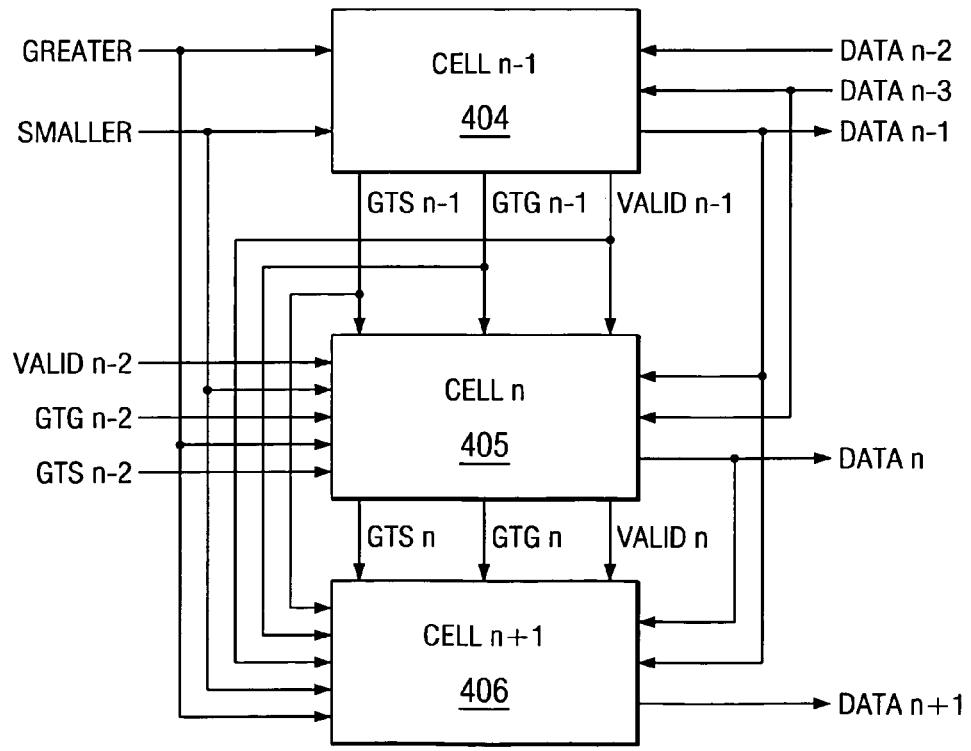
FIG. 6 illustrates communication among basic sorting units of an example of this invention.

FIG. 6 illustrates the communication between a representative group of basic units (404, 405 and 406) for the example of n=2. In this example basic unit 405 receives: data from basic unit 403; the valid signal of basic unit 403; the gts signal from basic unit 403; data from basic unit 404; the valid signal from basic unit 404; the gtg signal from basic unit 404; the gtg signal from basic unit 403; and the gts signal from basic unit 404.

In operation, sorting network 110 initially places the greatest input data word into the top basic unit. Remaining basic units store the other initial input data words in order from greatest to least. On initial storage in the basic unit, the valid signal is changed from invalid to valid. Upon the next cycle, sorting network 110 receives n more pre-sorted data words. The top basic cell selects either the prior greatest entry or the greatest input from pre-sorting network 101. Each basic unit determines whether to replace the current data based upon the comparison of the n new input data words and the status of the basic units above. Any basic unit can have its current entry replaced by one of the entries from the n basic cells above it, or by one of the n new input words based on the comparator results of its own comparator and those comparators of the n basic units above it. On entry of new data into a basic unit, that basic unit pushes down the prior entry for storage in a lower basic unit.

An implementation of this invention as sorting filter for n=2 new data streams of 16-bit data for a 16 entry list requires about 11 K gates. This hardware can operate at the 123 MHz rate of the reset of the wireless processor.

What is claimed is:

1. A data processing apparatus for simultaneously sorting a plurality of n input data words into a sorted list of m list entries comprising:

a pre-sorting network receiving said n input data words and generating n outputs in a single clock cycle, said pre-sorting network including:

a set of n(n−1)/2 comparators wherein n=2 or more, each comparator receiving a unique pair of said n input data words and generating a comparison output indicating which of said pair of input data words is greatest, said set of comparators together simultaneously comparing all unique pairs of said n input data words, a set of n multiplexers, each multiplexer having n inputs receiving said n input data words and an output of a selected one of said n input data words, and a decoder circuit receiving said comparison output of said n(n−1)/2 comparators and generating control signals to control said selected output of each multiplexer whereby said output of said multiplexers correspond to said n input data words sorted from greatest to least;

a sorting network storing up to m list entries in said single clock cycle and receiving the sorted n input data words and storing respective input data words into said m list entries.

2. A data processing apparatus for simultaneously sorting n input data words into a sorted list of m list entries comprising:

a pre-sorting network receiving said n input data words and generating n outputs corresponding to said n input data words sorted from greatest to least in a single clock cycle;

a sorting network storing up to m list entries and receiving the sorted n input data words and storing respective input data words into said m list entries in said single clock cycle, said sorting network including m basic units, each basic unit storing a corresponding current list entry ordered from greatest to least, receiving the sorted n input data words and receiving said current list entry of n basic units storing greater list entries, each basic unit selecting for storage one of (1) said current list entry, (2) a current list entry of one of said n basic units storing greater list entries or (3) one of said n input data words, each basic unit including:

a data register for storing said current list entry;

n comparators wherein n=2, each comparator having a first input connected to said data register and a second input receiving a corresponding one of said n input data words, each comparator comparing said current list entry with said corresponding one of said n input data words and generating comparison output indicating whether said current list entry is greater than said corresponding one of said n input data words, a multiplexer having 2n+1 input connected to said data register for receiving said current list entry, receiving said current list entry for each of n basic units storing greater current list entries and said n input data words, each multiplexer having an output of a selected one of said current list entry, said current list entries said n basic units storing greater current list entries and said n input data words, and a control circuit receiving said comparison outputs of said n comparators and said comparison outputs of said n comparators of said n basic units storing greater current list entries, said control circuit generating control signals to control said selected output of said multiplexer.

3. The data processing apparatus of claim 2, wherein:
each basic unit further includes:
a valid bit storing an indication whether the current list entry is valid,
and said control circuit further receives said valid bit from said n basic units storing greater current list entries.

4. The data processing apparatus of claim 3, wherein:
each basic unit further includes n OR gates, each OR gate having a first input connected to said valid bit for receiving said valid signal, a second input connected to a corresponding one of said comparators for receiving said comparison output and an output connected to said control circuit.

* * * * *